Nov. 28, 1944.   M. B. SAWYER   2,364,000
ELECTRIC MOTOR
Filed Aug. 19, 1942
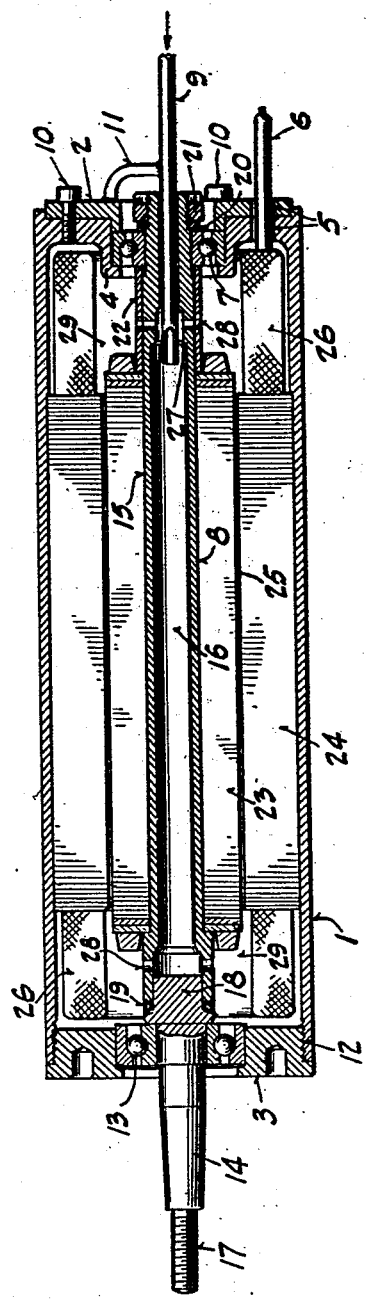
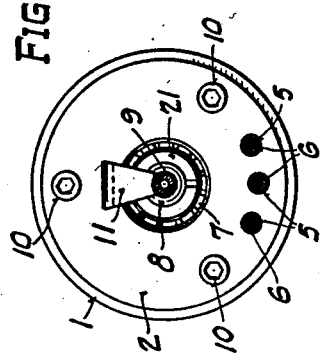
Marion B. Sawyer
INVENTOR
BY Elwin A. Andrus
ATTORNEY Patented Nov. 28, 1944

2,364,000

UNITED STATES PATENT OFFICE 2,364,000

ELECTRIC MOTOR

Marion B. Sawyer, Los Angeles, Calif., assignor to Sawyer Electrical Mfg. Co., Los Angeles, Calif., a corporation of California Application August 19, 1942, Serial No. 455,315

2 Claims. (Cl. 172—36)

This invention relates to an electric motor.

The principal object of the invention is to provide a motor with a high horsepower rating per unit of weight and of size.

Another object is to improve the cooling of a small size motor of high speed and high horsepower rating by employing an insulating refrigerating medium.

Other objects of the invention will appear from the following description of an embodiment of the invention illustrated in the accompanying drawing.

In the drawing:

Figure 1 is a longitudinal sectional view of a motor embodying the features of the invention; and Fig. 2 is an end view of the embodiment shown in Fig. 1.

Referring to the drawing, there is illustrated an induction motor having a generally cylindrical housing 1 with a cap 2 at the rear end and end head 3 at the front end.

The housing 1 at its rear end is provided with an inwardly extending flange 4. Apertures 5 disposed in the flange 4 and cap 2 permit passage of motor leads or connections 6 from the motor to a source of power. The flange 4 has a central opening for receiving a bearing 7 to support the motor shaft 8 for high speed rotation. A capillary tube 9 enters the rear end of shaft 8 which projects through a central opening in the cap 2. The cap is secured to the flange 4 by suitable screws 10 and has a bracket 11 to which the tube 9 is soldered.

The front end of the housing 1 is provided at its inner end with threads 12 to receive the end head 3 therein and complete the enclosure of the induction motor.

The shaft 8 is mounted for rotation within the housing 1, one end thereof being disposed in the bearing 7 within the rear end of the housing and the other end portion being mounted in the bearing 13 disposed in a central opening in the head 3 at the front end of the housing.

In the embodiment illustrating the invention the generally cylindrical shaft 8 is composed of a front section 14 and a rear section 15. The rear section 15 is hollow throughout its entire extent to provide the chamber 16 whereas the front section 14 is a solid cylindrical member.

The outer end portion of section 14 of the shaft 8 projects through the end head 3 for a substantial distance and the extreme outer end of section 14 is provided with threads 17 to receive a nut to secure a pulley or other suitable power transmitting means on a tapered portion of the section 14. The inner end of section 14 constitutes a shouldered plug 18 disposed within the end of the rear section 15 and the weld 19 joins the two sections of shaft 8 together. The plug 18 provides a closure for the forward end of chamber 16.

The rear end portion of section 15 of shaft 8 is disposed within the cap 2. A washer 20 is provided around the outer end portion of section 15 of shaft 8 and a nut 21 is threaded onto this end of shaft 8 against the washer and co-operates with spacing sleeve 22 and bearing 7 to hold the shaft securely in place within the housing.

The rotor 23 is secured to the shaft 8 at a central position of the shaft within the housing 1 and extends for the greater portion of the length of the housing. The rotor 23 is small in diameter and has a substantial length. It preferably is of the usual squirrel-cage type having suitable laminations, end rings and connecting bars. In constructing the rotor the end rings and connecting bars are preferably cast of silver as silver is a good conductor and is adapted for pouring a rotor of small size in that it freezes slowly.

In experiments on the induction motor of the invention, it was found that by fabricating the motor with a diameter of two inches and an overall length of 6¾ inches, including the end bearings, three horsepower was readily developed with the motor making 18,000 R. P. M. The weight of such a motor was approximately four pounds. By designing a motor of a diameter of only two inches, the diameter of the laminae and end bars is necessarily small. It is important, therefore, in making the rotor, that a metal such as silver be employed. Molten silver retains its heat and can be poured into a small rotor form without freezing in the mold before the rotor is completely poured.

The stator 24 engages the inside of housing 1 and is spaced from rotor 23 to provide an annular air gap 25. The stator winding 26 is supplied with current by the motor leads or connections 6.

For the purpose of cooling the motor a liquid or fluid refrigerant, such as "Freon," is introduced preferably at the rear end of shaft 8 and into the chamber 16 by means of the capillary tube 9 of small diameter and extending from the "Freon" source, not shown, to a point that is a short distance within the chamber 16.

It is preferred that "Freon" be employed rather than other refrigerants as "Freon" gas is a good electrical insulator of generally high purity and, therefore, a poor conductor. The use of "Freon" eliminates the risk of shortage in the motor which is an important feature in a motor of the size of the invention.

The pressure at which the "Freon" is released varies with the temperature of the rotor as the temperature of the latter should not be decreased to a point where frost accumulates on its outer areas. The temperature of the rotor determines the resistance and slip of the rotor. It is intended, however, to maintain a small amount of the liquid "Freon" on the interior of the rotor shaft 8 when the motor is in operation. The centrifugal force developed by the rotation of the shaft flows the liquid longitudinally along the wall of chamber 16 close to the rotor 23. A shoulder 27 in the rear end of chamber 16 prevents escape of liquid "Freon" through the rear end of the shaft.

The expansion of the "Freon" into the atmosphere in chamber 16 by the heat transferred to it from the rotor through the walls of shaft 8 causes the liquid to gasify and produce a temperature such as 20° below zero at one hundred pounds per square inch pressure. The length of chamber 16 and the radial compactness of the rotor provides a relatively rapid transfer of heat from the rotor through the walls of the shaft to the "Freon." Silver, being a very good conductor of heat, facilitates this heat transfer to the "Freon." The Freon gas vents through the respective openings 28 provided at the opposite ends of chamber 16 and extending through the shaft 8 from the chamber 16 to the respective winding spaces 29 disposed at the opposite ends of the rotor. The gas then absorbs heat from the stator winding 26 and stator 24, part of the gas passing through gap 25 between the rotor and stator to gradually escape through apertures in the housing such as bearings 7 and 13.

The extremely low temperature produced in the "Freon" as it engages the inner circumference of rotor 23 within chamber 16 in combination with the small diameter and substantial length of the rotor results in effective cooling of the rotor. The "Freon" also removes heat from the stator across air gap 25 between the rotor and stator as the differential in temperature between the rotor and stator becomes appreciably great. The employment of the openings or passageways 28 at the opposite ends of chamber 16 to the winding spaces 29 permits the "Freon" to further expand into a gaseous state and to absorb heat directly from the stator.

Instead of employing the passageways 28 from the chamber 16 directly to the spaces 29, they may be provided through the rotor itself from the chamber 16 to the air gap between the stator and rotor, or they may be augmented by such additional passages.

The invention is adapted to be employed in small diameter motors of substantial length developing extremely high horsepower. Its employment results in effective cooling of the motor and elimination of injury to the same by overheating. The invention provides a motor of high horsepower rating per unit of weight and size as compared to small sized motors made heretofore.

Various embodiments of the invention may be employed within the scope of the accompanying claims.

I claim:

1. In an electric motor of high horsepower rating per unit of weight, a rotor of small diameter and substantial length with the electrical parts thereof of cast silver and with its shaft hollow, means to introduce liquid "Freon" refrigerant into said hollow shaft to be thrown outwardly against the inner surface of the shaft by centrifugal action and thereby absorb heat rapidly inwardly from the rotor, the shaft having openings at the opposite ends of the rotor to provide an escape for gaseous refrigerant from the same into the motor chamber surrounding the rotor and stator to thereby cool the latter, and means allowing the gradual escape of the "Freon" gas from the motor chamber.

2. In an electric motor of high horsepower rating per unit of weight, a rotor of small diameter and substantial length with the electrical parts thereof of cast silver and with its shaft hollow, means to introduce a phase-changing liquid refrigerant into said hollow shaft to be thrown outwardly against the inner surface of the shaft by centrifugal action and thereby absorb heat rapidly inwardly from the rotor, the shaft having openings at the opposite ends of the rotor to provide an escape for gaseous refrigerant from the same into the motor chamber surrounding the rotor and stator to thereby cool the latter, means in the shaft to prevent the escape of liquid refrigerant through said openings, and means for the gradual escape of the gas from the motor chamber.

MARION B. SAWYER.